United States Patent [19]

Inaba et al.

[11] Patent Number: 4,939,768
[45] Date of Patent: Jul. 3, 1990

[54] CAR TELEPHONE EQUIPMENT HAVING AUTOMATIC CALLING FUNCTION

[75] Inventors: Tsutomu Inaba, Hachioji; Kuniyoshi Marui, Tokorozawa, both of Japan

[73] Assignee: Kabushiki Kaisha Toshiba, Kawasaki, Japan

[21] Appl. No.: 245,256

[22] Filed: Sep. 16, 1988

[30] Foreign Application Priority Data

Sep. 18, 1987 [JP] Japan ................................ 62-234432

[51] Int. Cl.$^5$ ............................................ H04M 1/65
[52] U.S. Cl. ...................................... 379/58; 379/63; 379/88
[58] Field of Search ............... 379/58, 63, 88; 301/46; 455/79, 54

[56] References Cited

U.S. PATENT DOCUMENTS 4,481,382 11/1984 Villa-Real ............................. 379/61
4,731,811 3/1988 Dubus .................................... 379/58

OTHER PUBLICATIONS

Seki et al "Detachable Unit Service in 800 MHz Band Cellular Radio Telephone System", *IEEE Communications* vol. 24, No. 2, 2/86 pp. 47–52.

*Primary Examiner*—Robert Lev
*Attorney, Agent, or Firm*—Finnegan, Henderson, Farabow, Garrett and Dunner

[57] ABSTRACT

A car telephone equipment having an automatic calling function which can automatically call a destination party after passage of a specified time period or at a predetermined time. A telephone number of the party is stored in a dial number memory, a desired time period is set at a timer or a desired time is stored in a time register, so that a radio communication circuit is established between the telephone equipment and a base station to perform an automatic calling operation over the destination party telephone number stored in the dial number memory at the moment when the timer times out or when a time of a clock coincides with the time stored in the time register.

11 Claims, 6 Drawing Sheets

CAR TELEPHONE EQUIPMENT HAVING AUTOMATIC CALLING FUNCTION

BACKGROUND OF THE INVENTION

1. Field of the Invention

The present invention relates to car telephone equipment and, more particularly, to a car telephone equipment that can automatically call a destination party after passage of a specified time period or at a specified time; that is, a car telephone equipment that has an automatic calling function.

2. Description of the Related Art

Recently, car telephone equipment have spread in communication service fields.

Known in the art is a car telephone equipment that has a voice recognition function to allow the user of the equipment to easily achieve calling and speech operations even during driving of a car. There is car telephone equipment that has a voice dialing function that automatically calls another party in response to a voice utterance and thus eliminates the need for any key input dialing operation.

With such a car telephone equipment having the voice dialing function, when the user must call a predetermined destination party at a predetermined time, from the car telephone the user must remember to place the call while driving; thus presenting either hazardous driving conditions or a situation in which the user forgets to dial or call the predetermined destination party.

In view of such circumstances, it is an object of the present invention to provide a car telephone equipment which can perform an automatic calling operation over a preset telephone number at a preset time or after passage of a preset time period.

SUMMARY OF THE INVENTION

In accordance with the present invention, the above object is attained by providing a car telephone equipment which comprises means for inputting a telephone number, number storage means for storing the input telephone number, time control means for having a clock function or a timer function, specification means for specifying a predetermined telephone number previously stored in the number storage means and for specifying a predetermined time or a predetermined time interval for the time control means, and means for calling a destination party corresponding to the predetermined telephone number specified by the specification means when a time or a time period at the time control means coincides with the predetermined time or the predetermined time period specified by the specification means.

In the present invention, when a time or a time period at the time control means coincides with the predetermined time or the predetermined time period specified by the specification means, the calling means can reliably perform a calling operation over the predetermined telephone number specified by the specification means.

In this way, the car telephone equipment of the present invention can positively call the destination party corresponding to the predetermined telephone number specified by the specification means through the calling means when a time or a time period at the time control means coincides with the predetermined time or the predetermined time period specified by the specification means. As a result, even if the user concentrates his attention on the car driving, the telephone equipment can automatically call the predetermined party at the predetermined time or after passage of the predetermined time period. Thus, the user can keep his mind only on the driving and even when he forgets to call the party, the telephone equipment, in place of him, can call the destination party reliably and automatically.

DESCRIPTION OF THE PREFERRED EMBODIMENTS

An embodiment of the present invention will be detailed with reference to the accompanying drawings.

Figure 1:
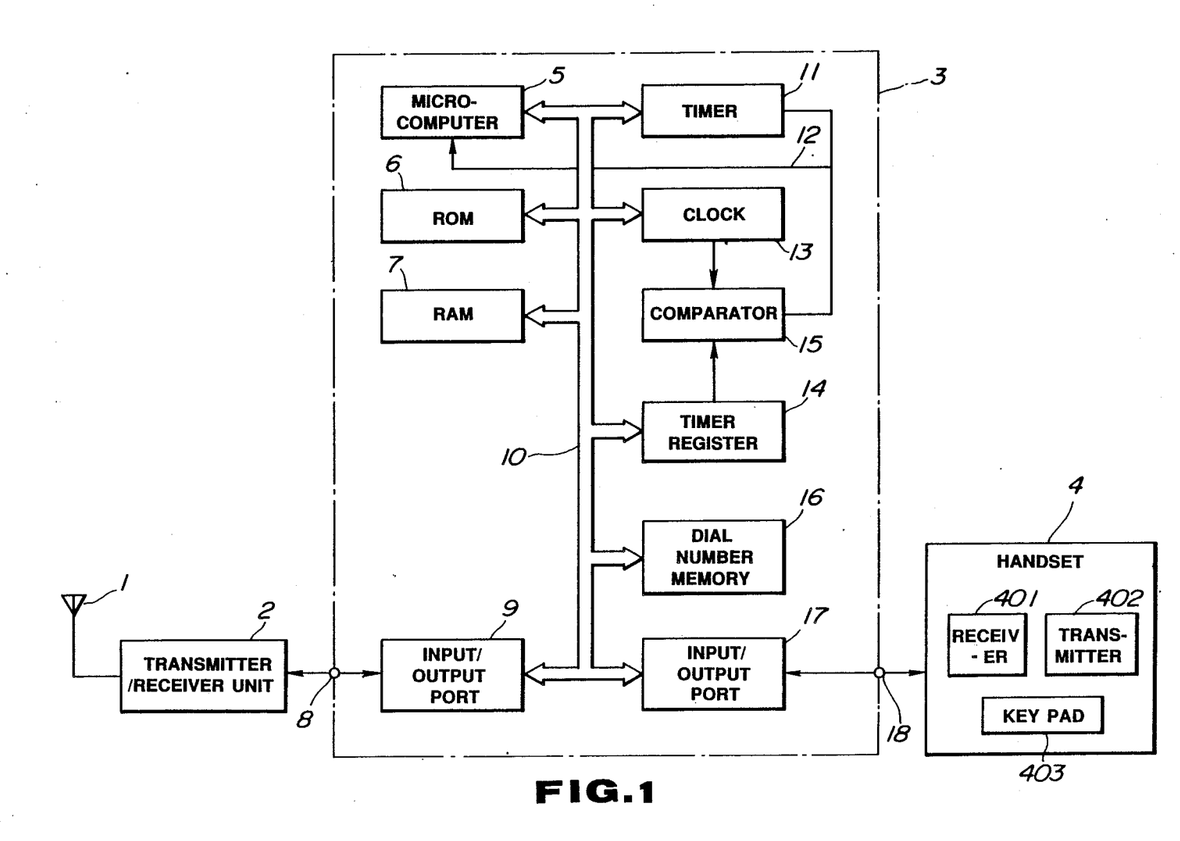
FIG. 1 is a block diagram showing an embodiment of a car telephone equipment having an automatic calling function in accordance with the present invention.

Referring first to FIG. 1, there is shown a block diagram of an embodiment of a car telephone equipment having an automatic calling function in accordance with the present invention. In the drawing, the car telephone equipment comprises an antenna 1, a transmitter/receiver unit 2, a control circuit 3 and a handset 4, which parts are mounted on a car (not shown).

The handset 4 includes a receiver 401 and a transmitter 402 through which a voice signal is vocally input and output respectively, and a key pad 403 for key inputting operation.

The control circuit 3 comprises a microcomputer 5 for control of various parts and for input and output of various types of signals, a nonvolatile memory (ROM) 6 for storing therein a program for control of the microcomputer 5 and the like, a volatile memory (RAM) 7 for storing therein various sorts of data, an interface connector 8 which connects the control circuit 3 to the transmitter/receiver unit 2, an input/output port 9 for the transmitter/receiver unit 2, a system bus 10 which are connected between various parts, a timer 11 which has set time information stored therein and which outputs an interrupt signal when the set time period has expired, an interrupt line 12, a clock 13 for outputting a time data, a time register 14 for storing therein a time data that is received from the handset 4 through key operation or voice input and that corresponds to a time at which the telephone equipment is to call, a comparator 15 which compares a time data generated at the clock 13 with a time data stored in the time register 14 and outputs an interrupt signal when finding a coincidence therebetween, a dial-number memory 16 for storing the telephone number of a destination party which is received from the handset 4 through key operation or voice input and with which the telephone equipment is to call the destination party, an input/output port 17 for the handset 4, and an interface connector 18 which connects the control circuit 3 to the handset 4.

Explanation will next be made as to the operation of the car telephone equipment of such an arrangement as mentioned above when performing its automatic calling function. Assume in the following explanation that the specification of a calling time period and a calling time is effected on a vocal input basis and the input of a destination party telephone number is similarly vocally effected.

Figure 2:
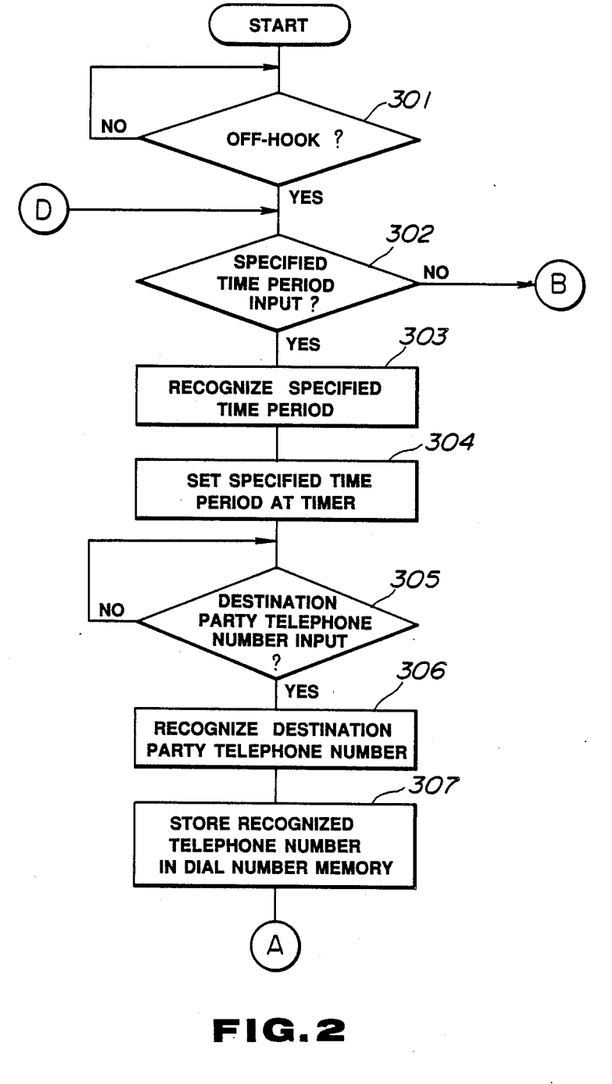
FIGS. 2 to 4 shows a flowchart for explaining the operation of the embodiment of FIG. 1.
Figure 3:
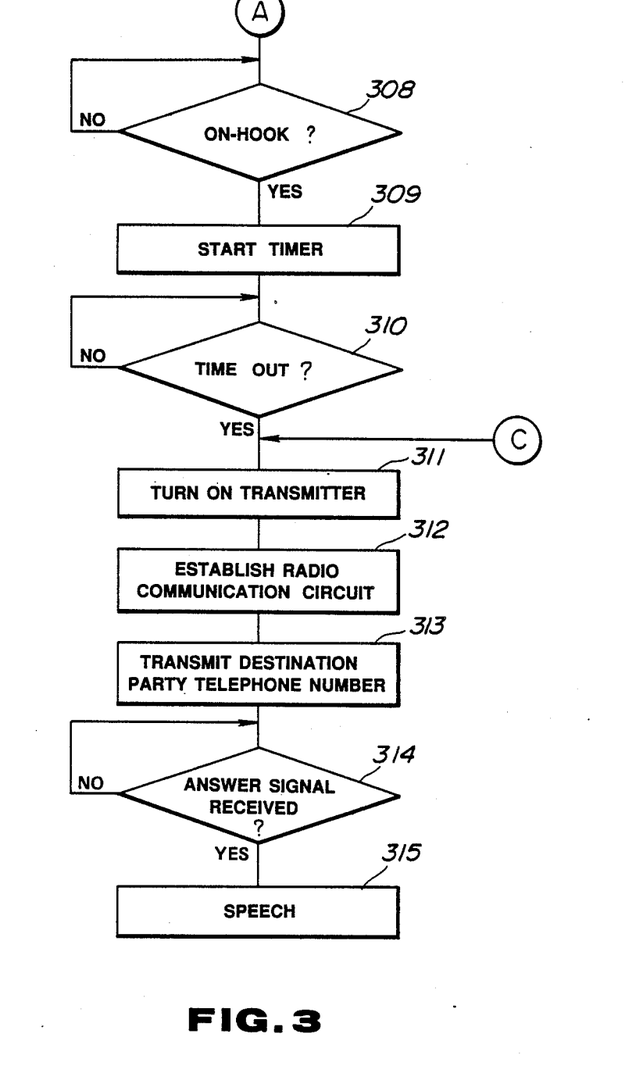

First, when it is desired to automatically call a desired destination party after passage of a desired time, the operator of the telephone equipment picks up the handset 4 to put the handset in its off-hook state and utters a desired calling time period and a desired destination party telephone number through the transmitter 402 of the handset 4 for the purpose of voice input. For example, when the operator speaks "30 minutes later" and then the desired destination party telephone number "xxx -xxx - xxxx", the information indicative of the off-hook state of the handset 4, the voice information indicative of the desired time period and the voice information indicative of the party telephone number are input to the microcomputer 5 through the interface connector 18, the input/output port 17 and the system bus 10. The microcomputer 5, when receiving this information, carries out such processings as shown in FIGS. 2 and 3 on the basis of the received information.

When the handset 4 is put in the off-hook state (step 301), the microcomputer 5 checks the absence or presence of the specified time period as the next voice input (step 302). The presence of the second specified time voice input causes the microcomputer 5 to recognize the second voice input (step 303). The voice input recognization by the microcomputer 5 may be executed by a well known speech recognization technique, for example, by previously storing the voice pattern of the operator in the memory and by comparing the input voice pattern with the previously stored reference voice pattern to recognize the input voice.

When recognizing the specified voice input time period at the step 303, the microcomputer 5 sets the specified time period in the timer 11 (step 304). The microcomputer then judges whether or not a voice input on a destination party telephone number is present (step 305). The presence of the destination party telephone number voice input causes the microcomputer 5 to recognize the voice-input party telephone number (step 306). The voice recognition of the party telephone number may be carried out by the similar technique to that used in the foregoing voice recogition of the specified time period.

After having recognized the voice-input destination party telephone number at the step 306, the microcomputer then stores the recognized destination party telephone number in the dial number memory 16 (step 307).

Subsequently, the microcomputer 5 judges whether or not the handset 4 is in its on-hook state (step 308). The judgement of the on-hook state causes the microcomputer 5 to start the timer 11 (step 309).

After that, the microcomputer 5 monitors whether or not the timer 11 has expired or timed out (step 310). The time-out of the timer 11 causes an automatic call request to be sent from the timer 11 through the interrupt line 12 to the microcomputer 5, so that the microcomputer 5 turns on the transmitter of the transmitter/receiver unit 2 (step 311) to establish a radio circuit between the telephone equipment and a base station (not shown) (step 312), to transfer the contents of the dial number memory 16 indicative of the party telephone number to a calling telephone number memory zone in the RAM 7, and to transmit the destination party telephone number from the transmitter (step 313). And the telephone equipment, when receiving an answer signal from the party in response to the transmission of the party telephone number (step 314), is put in a speech mode (step 315). In this manner, when the user merely inputs a desired time period and a desired destination party telephone number to the telephone equipment through the transmitter 402 of the handset 4, the telephone equipment can automatically call the desired input party after passage of the desired time period.

Explanation will next be made as to the operation of the telephone equipment when calling a desired destination party at a desired time. To this end, the operator first causes the handset 4 to go off-hook and speaks a desired time and a party telephone number for their voice input. For example, the operator utters "at two fourty" and then a destination party telephone number "xxx - xxx - xxxx". This results in that the information indicative of the off-hook state of the handset 4, the voice information indicative of the desired time and the voice information indicative of the party telephone number are input to the microcomputer 5 through the interface connector 18, the input/output port 17 and the system bus 10.

Figure 4:
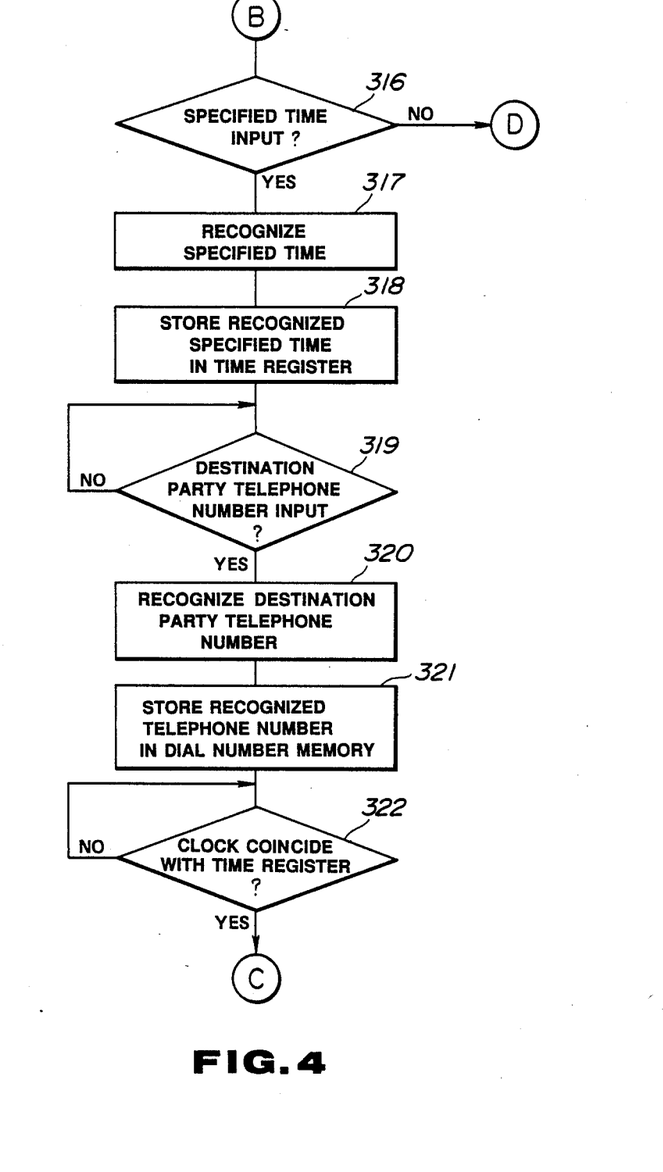

The microcomputer 5 detects that the handset 4 has been put in the off-hook state (step 301). If not a specified time period but a specified time is vocally input (step 302), then the microcomputer 5 detects it at a step 316 and then recognizes the voice-input specified time at a step 317.

The recognization of the voice-input specified time at the step 317 causes the microcomputer 5 to store the recognized specified-time in the time register 14 (step 318).

The microcomputer then judges whether or not the voice input on the party telephone number is present (step 319). When the microcomputer 5 judges the presence of the party-telephone-number voice input, it recognizes the voice-input destination party telephone number (step 320).

After having recognized the voice-input party telephone number at the step 320, the microcomputer 5 then stores the recognized destination party telephone number in the dial number memory 16 (step 321).

After that, the microcomputer 5 detects, on the basis of an output of the comparator 15, whether or not the contents of the clock 13 coincides with the contents of the time register 14 (step 322). If the microcomputer 5 detects the coincidence between the contents of the clock 13 and the contents of the time register 14 at the comparator 15, then the microcomputer 5 receives an automatic calling request from the comparator 15 through the interrupt line 12. As a result, the microcomputer 5 turns on the transmitter of the transmitter/receiver unit 2 (step 311) to establish a radio communication circuit between the telephone equipment and a base station (not shown) (step 312), to transfer the contents of the dial number memory 16 indicative of the party telephone number to a calling telephone number memory zone in the RAM 7, and to transmit the party telephone number from the transmitter (step 313). And the telephone equipment, when receiving an answer signal from the party in response to the transmission of the destination party telephone number (step 314), is put in the speech mode (step 315).

In this way, in the present embodiment, the destination party telephone number and calling time period (after expiration of which, the calling is to be done by the telephone equipment) or the calling time are previously vocally input to the telephone equipment through the handset 4 to previously store the telephone number in the dial number memory 16 and the time period in the timer 11 or the time in the time register 14, so that, when the timer 11 times out or when the comparators 15 finds a coincidence between the time of the clock 13 and the time of the time register 14, the microcomputer 5 can automatically call the destination party. As a result, even if the user or driver of the car carrying the telephone equipment concentrates on his car driving, he can reliably call the desired party at the predetermined time or after passage of the predetermined time interval and have a conversation with the party without being nervous about the calling time.

The foregoing embodiment has been arranged so that the operation of the telephone equipment is repeated until the equipment receives the specified time interval input or the specified time input at the step 302 or 316, until the equipment receives the destination party telephone number input at the step 319 or until the equipment receives the answer signal from the destination party at the step 314. However, in practical applications, a time monitoring element is provided in each of these repetitive loops so that the expiration of a predetermined time enables the control to go out of these loops.

Further, although the destination party telephone number and the calling time period (after expiration of which, the calling is to be done by the telephone equipment) or the calling time are vocally input to the telephone equipment through the receiver 402 of the handset 4 in the foregoing embodiment, the destination party telephone number and the calling time period or the time may be input through the key operation of the key pad 403 of the handset 4. In this connection, the latter case can also be arranged in substantially the same manner as in the foregoing embodiment.

Figure 5:
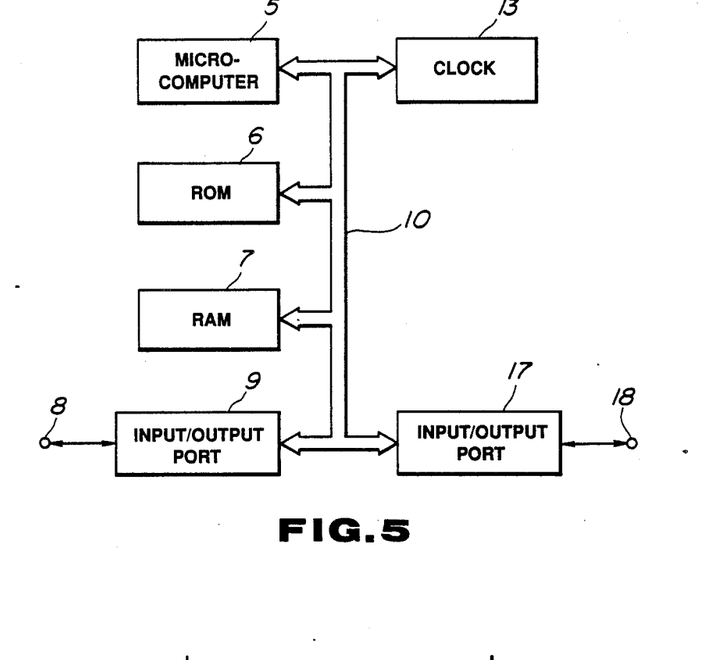
FIG. 5 is a block diagram showing a control circuit in another embodiment of the present invention.
Figure 6:
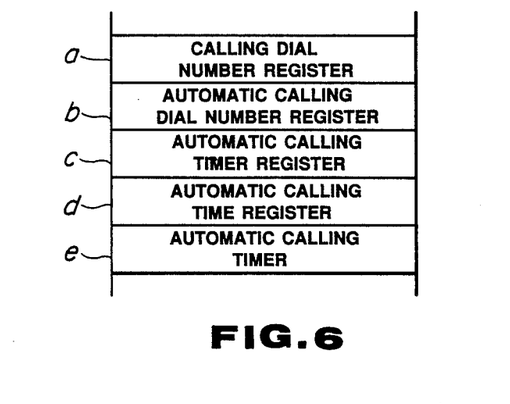
FIG. 6 is a memory map for explaining the areas of a RAM in FIG. 5.

Furthermore, in the foregoing embodiment, the timer 11, time register 14 and dial number memory 16 explained in connection with FIG. 1 may be secured in the RAM 7 as shown by a block diagram in FIG. 5 to thereby realize on a software basis the calling request resulting from the timer 11 and comparator 14 in the foregoing embodiment. In this case, the area map of the RAM 7 in FIG. 5 is shown in FIG. 6 and comprises a calling dial number register area a, an automatic calling dial number register area b, an automatic calling timer register area c, an automatic calling time register area d and an automatic calling timer area e.

Figure 7:
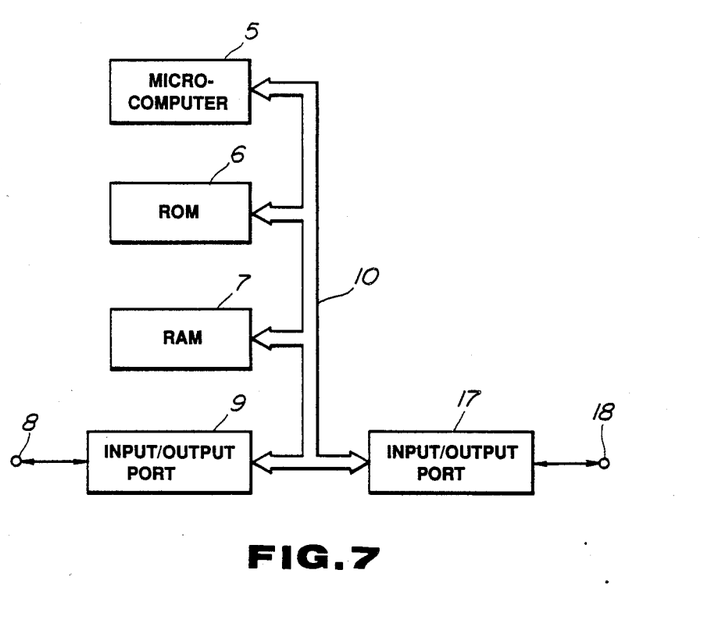
FIG. 7 is a block diagram showing a control circuit in yet a further embodiment of the present invention.
Figure 8:
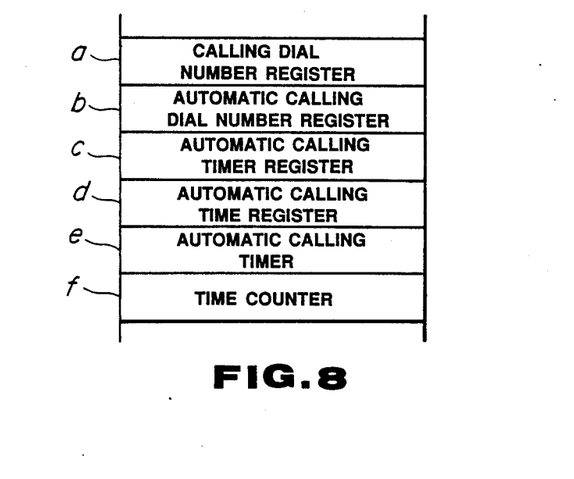
FIG. 8 is a memory map for explaining the areas of a RAM in FIG. 7.

In each of the foregoing embodiments, the function area of the clock 13 explained in connection with FIGS. 1 and 5 may also be secured in the RAM 7 as shown by a block diagram in FIG. 7 to thereby realize on a software basis the calling request resulting from the timer 11 and comparator 14 and the function of the clock 13 in the foregoing embodiment, in which case the area map of the RAM 7 in FIG. 7 comprises, in addition to such areas a to e, a time counter area f for realizing the clock function, as shown in the memory map of FIG. 6 as shown in FIG. 8. The areas a to e in FIG. 8 are the same as those in FIG. 6 and thus explanation thereof is omitted.

We claim:

1. A car telephone equipment installed on an automobile to be coupled with a base station disposed at a predetermined location through a radio communication circuit, said equipment comprising:

voice input means for inputting a telephone number of a destination party and a time period after passage of which a call is initiated;
voice recognizing means for recognizing the telephone number and time period inputted by the voice input means; timer means;
means for setting, at the timer means, the time period recognized by the voiced recognizing means;
means for detecting a time-out state of said timer means; and
automatic calling means for establishing said radio communication circuit between said base station and the equipment in response to a detection output of said detecting means and for performing an automatic calling operation using said destination party telephone number recognized by the voice recognizing means.

2. A car telephone equipment installed on an automobile to be coupled with a base station disposed at a predetermined location through a radio communication circuit, said equipment comprising:

voice input means for inputting a telephone number of a destination party and a time period after which a call is initiated;
voice recognizing means for recognizing the telephone number and time inputted by the voice input means;
time generating means;
means for detecting a coincidence between a time generated by said time generating means and a time recognized by said voice recognizing means; and
automatic calling means for establishing said radio communication circuit between said base station and said equipment in response to a detection output of said detecting means and performing an automatic calling operation using said destination party telephone number recognized by said voice recognizing means.

3. A car telephone equipment as set forth in claim 1, wherein said voice input means is a transmitter of a telephone handset and a voice input is carried out in an off-hook state of said handset.

4. A car telephone equipment as set forth in claim 1, wherein said voice recognizing means includes a memory for storing therein a predetermined voice pattern and means for comparing said voice pattern stored in said memory with a voice input to perform voice recognition.

5. A car telephone equipment as set forth in claim 1, wherein said setting means includes means for detecting an off-hook state of said telephone handset and means responsive to detection of the off-hook state of the handset for setting said time period at said timer means.

6. A car telephone equipment as set forth in claim 1, wherein said automatic calling means includes storage means for storing therein the destination party telephone number recognized by said voice recognizing means and means for performing an automatic calling operation on the basis of the destination party telephone number stored in said storage means.

7. A car telephone equipment as set forth in claim 2, wherein said voice input means is a transmitter of a telephone handset and a voice input is carried out in an off-hook state of said handset.

8. A car telephone equipment as set forth in claim 2, wherein said voice recognizing means includes a memory for storing therein a predetermined voice pattern and means for comparing said voice pattern stored in said memory with a voice input to perform voice recognition.

9. A car telephone equipment as set forth in claim 2, wherein said detecting means includes a register for storing therein the time recognized by said voice recognizing means and means for comparing said time stored in said register with the time generated from said time generating means to detect a coincidence between the both times.

10. A car telephone equipment as set forth in claim 2, wherein said automatic calling means includes storage means for storing therein the destination party telephone number recognized by said voice recognizing means and means for performing an automatic calling operation on the basis of the destination party telephone number stored in said storage means.

11. A method of controlling a car telephone equipment comprising the steps of:
vocally inputting, in an off-hook state of a handset, a telephone number of a destination party and a time period after passage of which a call is initiated;
vocally recognizing said telephone number and time period inputted in said voice input step;
setting at timer means the time recognized in said vocally recognizing step;
starting said timer means in response to an on-hook operation of said handset; and
establishing a radio communication circuit between said base station and the equipment in response to a time-out state of the timer means and performing an automatic calling operation over said destination party telephone number recognized in said voice recognizing step.

* * * * *